United States Patent [19]
Parquet

[11] 3,756,280
[45] Sept. 4, 1973

[54] SPOOL VALVE LANDS HAVING SPHERICALLY-CURVED SEALING SURFACES

[75] Inventor: Donald James Parquet, Waterloo, Iowa

[73] Assignee: Deere & Company, Moline, Ill.

[22] Filed: Aug. 19, 1971

[21] Appl. No.: 173,098

[52] U.S. Cl... 137/625.25, 137/625.27, 137/625.67, 251/84
[51] Int. Cl. .......................................... F16k 11/60
[58] Field of Search .................. 137/625.69, 625.27, 137/625.67, 625.25; 251/86, 88, 84

[56] References Cited
UNITED STATES PATENTS

| 2,837,114 | 6/1958 | Ruhl | 137/596.2 |
| 2,918,906 | 12/1959 | Becker | 137/625.25 |
| 3,122,154 | 2/1964 | Siebel et al. | 251/282 X |
| 3,384,122 | 5/1968 | Harpman | 251/143 X |
| 3,530,897 | 9/1970 | Buchanan | 137/625.25 X |

FOREIGN PATENTS OR APPLICATIONS

| 561,698 | 5/1944 | Great Britain | 137/625.25 |
| 543,767 | 5/1956 | Italy | 137/625.25 |

Primary Examiner—Henry T. Klinksiek
Assistant Examiner—Robert J. Miller
Attorney—H. Vincent Harsha et al.

[57] ABSTRACT

A valve spool comprises a stem on which one or more balls or central segments of balls are mounted to form lands having spherical sealing surfaces to accommodate the valve spools to valve bores having portions slightly axially misaligned. Selected balls or ball segments are mounted on the stem for limited radial movement to enhance accommodation to the misaligned bore portions.

7 Claims, 2 Drawing Figures

PATENTED SEP 4 1973                                      3,756,280

INVENTOR.
D. J. PARQUET

SPOOL VALVE LANDS HAVING SPHERICALLY-CURVED SEALING SURFACES

BACKGROUND OF THE INVENTION

The present invention relates to spool valves and more particularly relates to valve spools comprising stems on which are mounted members forming lands having spherical sealing surfaces.

As is well known in the art, valve spools normally comprise stems having integral cylindrical lands formed annularly thereabout. In order for valves embodying these spools to work properly, it is required that the lands be formed concentrically to the stem axis, that the bore in which the spool is to operate does not include axially misaligned portions and that the lands and bores be properly sized and finished to provide the necessary sliding and sealing fit. Mass production techniques cannot be used and still maintain the necessary manufacturing tolerances for insuring that all of these requirements are met for producing a suitable spool valve and other production techniques are quite expensive.

SUMMARY OF THE INVENTION

According to the present invention, there is provided a novel valve spool construction for a spool valve.

It is an object of the invention to provide a valve spool which can be manufactured by and can be embodied in spool valves manufactured by mass production techniques. Specifically, it is an object of the invention to provide a valve spool comprising a stem having lands removably mounted thereon, the lands having spherical seating surfaces whereby the valve spools may be accommodated to valve bores having axially misaligned portions.

A further object of the invention is to make the lands from finished steel balls such as bearings, which may be mass produced to very close tolerances, the lands each comprising one or more centrally drilled balls or central segments of balls.

Yet another object is to loosely mount selected ones of the aforementioned lands or land segments on the valve stem to provide additional flexibility for accommodating the valve spool to misaligned bores as well as making it unnecessary to preserve concentricity between the axes of the stem and lands or land segments.

These and other objects will be apparent from the ensuing description and appended drawings.

DESCRIPTION OF THE PREFERRED EMBODIMENT

Figure 1:
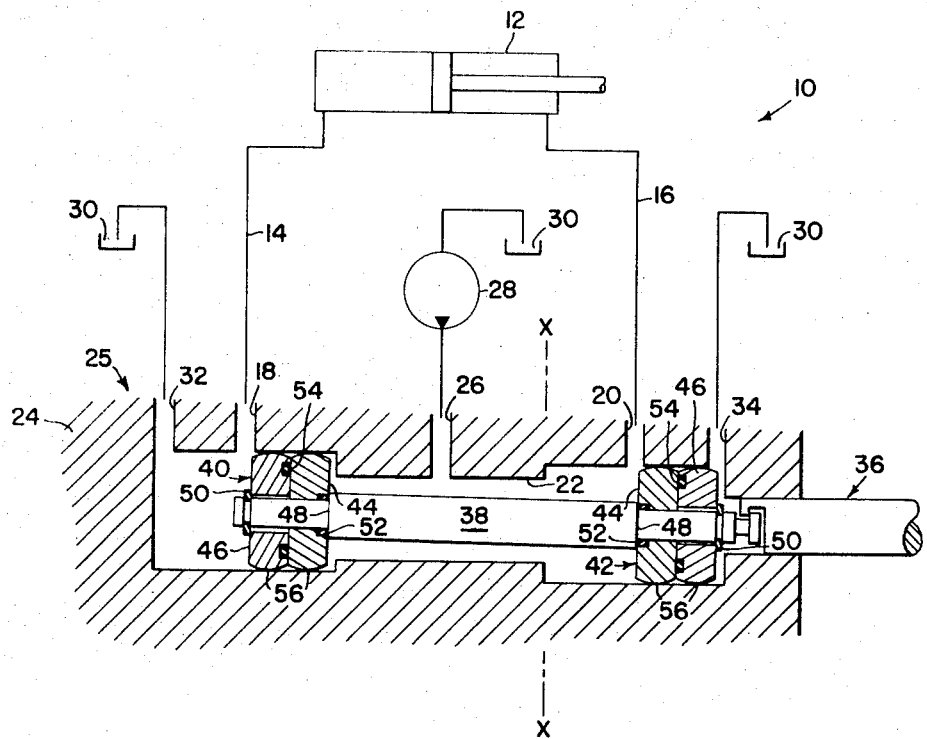
FIG. 1 is a schematic illustration of a hydraulic system for controlling a hydraulic cylinder with a spool valve, embodying the present invention, being in longitudinal section.

Referring now to the drawing, there is shown in FIG. 1 a hydraulic control system designated in its entirety by the reference numeral 10. The system 10 includes a double-acting hydraulic motor 12 having opposite work ports respectively connected, by means of lines 14 and 16, to a pair of control ports 18 and 20 intersecting a bore 22 located in a valve body 24 of a four-way, three-position spool valve 25. For the purpose of illustrating a feature of the invention described below, the portions of the bore 22 located on the opposite sides of a line X—X are axially offset or misaligned from each other. An inlet port 26 intersects the bore 22 between the ports 18 and 20 and is connected to the outlet of a pump 28 having its inlet connected to a sump 30. Also connected to the sump 30 are a pair of return ports 32 and 34, which respectively intersect the bore 22 adjacent the left and right ends of the latter.

For the purpose of selectively controlling the flow of fluid among the inlet, control and return ports, a valve spool or member 36 is shiftably mounted in the bore 22 and comprises a stem or shaft 38 having reduced left and right end portions on which are respectively mounted annular lands 40 and 42. The lands 40 and 42 each comprise inner and outer segments 44 and 46, the inner segments being tightly received on the stem 38 and being respectively in axial engagement with left and right shoulders 48 on the stem 38, and the outer segments being loosely received on the stem 38 and being respectively held in axial engagement with the inner segments by means of a pair of snap rings 50 respectively received in grooves adjacent the left and right ends of the stem 38. A first pair of O-ring seals 52 located in recesses in the inner faces of the inner segments 44 prevent leakage from occurring across the lands 40 and 42 along the shaft 38 and a second pair of O-ring seals 54 located in recesses in the inner faces of the outer segments 46 prevents leakage from occurring across the lands along a path passing along the interface of the segments 44 and 46. The segments 44 and 46 have spherical sealing surfaces 56 which permit the valve spool 36 to be accommodated to bores having axially misaligned portions such as bore 22 and the loose fit of the outer segments 46 aids in this accommodation and also makes it unnecessary to have the segments coaxial with the stem 38.

Figure 2:
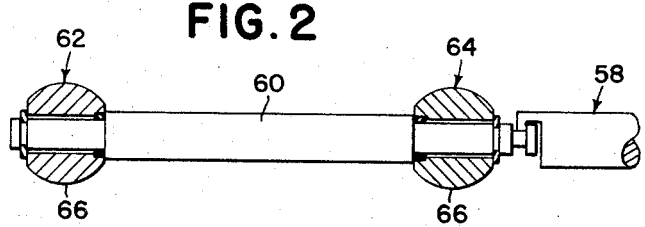
FIG. 2 is a view showing a modification of the valve spool shown in FIG. 1.

It is to be noted that each land may be made of more than two segments or may be made of one or more whole balls if desired. An example of the use of whole balls is illustrated in FIG. 2 wherein is shown a valve spool 58 comprising a stem 60 having a pair of whole balls mounted on its left and right ends thus forming lands 62 and 64, respectively, having spherical sealing surfaces 66.

The land segments 44 and 46 are preferably formed by first cutting equal amounts from the opposite ends of a steel ball, such as a bearing, thus leaving a central ball segment and by then drilling a hole through the center of the segment for mounting the latter on a valve stem. Lands such as the lands 62 and 64 (FIG. 2) may of course be made merely by drilling central mounting holes through whole steel balls.

An additional feature of the lands 40–42 and 62–64 is that their respective spherical surfaces 56 and 66 provide gradual metering during the blocking and uncovering of a port to and from which pressure fluid is flowing.

The general operation of the valve spools 36 and 58, as embodied in the valve 25, in selectively connecting the pressure fluid inlet port 26 to the control ports 18 and 20 and in blocking both control ports from the inlet port is conventional and no description is thought necessary. Suffice it to say that the spherical sealing surfaces of the valve spool lands make it unnecessary to keep close manufacturing tolerances for assuring axial alignment of bore portions which must be bored separately. The loose mounting of the lands aid further in accommodating the spools to misaligned bore portions and also make it unnecessary to maintain tolerances to keep the lands concentric with the spool axis. Also, the lands lend themselves to be mass produced by known techniques used in the ball bearing art, which techniques result in bearing surfaces which are finished within the tolerances necessary for good valve operation. An additional feature of the lands is that the spherical surfaces provide gradual metering during the closing and opening of ports. Thus, spool valves made according to the invention require less manufacturing precision and are easier and less expensive to manufacture than conventional valves and additionally provide gradual metering.

I claim:

1. In a hydraulic control valve including a valve body, a valve bore in said body, at least two ports intersecting said bore at axially spaced locations and a valve spool shiftably mounted in said bore and including a stem having at least one land extending annularly thereabout and being selectively positionable in said bore to permit and interrupt flow between said ports, the improvement wherein said land includes at least two side-by-side annular segments and each segment having a spherically curved sealing surface.

2. The invention defined in claim 1 wherein at least one of said annular segments is removably mounted on said stem for limited radial movement relative to said stem.

3. The invention defined in claim 1 wherein two axially spaced lands are mounted on said stem, each of said lands including at least two side-by-side annular segments and at least one of the annular segments of each land being mounted on said stem for limited radial movement relative to said stem.

4. The invention defined in claim 1 wherein said segments each include flat sides extending generally perpendicular to said stem and opposed sides of said segments being in axial engagement with each other.

5. The invention defined in claim 3 wherein said two segments of each land each include flat sides extending generally perpendicular to said stem and opposed sides of said two segments being in axial engagement with each other.

6. The invention defined in claim 4 wherein one of the opposed sides of said two segments of said land contains a recess encircling said stem and a sealing element being received in said recess for preventing fluid flow along the interface of said two segments.

7. The invention defined in claim 5 wherein one of the opposed sides of said two segments of each of said lands contains a recess encircling said stem and a sealing element being received in said recess for preventing fluid flow along the interface of said two segments of each of said lands.

* * * * *